US007015299B2

(12) United States Patent
Wilkinson

(10) Patent No.: US 7,015,299 B2
(45) Date of Patent: Mar. 21, 2006

(54) MELT SPUN THERMOPLASTIC POLYURETHANES USEFUL AS TEXTILE FIBERS

(76) Inventor: W. Kenneth Wilkinson, 1010 Glenwood Blvd., Waynesboro, VA (US) 22980

( * ) Notice: Subject to any disclaimer, the term of this patent is extended or adjusted under 35 U.S.C. 154(b) by 301 days.

(21) Appl. No.: 09/843,749

(22) Filed: Apr. 30, 2001

(65) Prior Publication Data
US 2002/0161137 A1 Oct. 31, 2002

(51) Int. Cl.
*C08G 18/32* (2006.01)
*C08G 18/42* (2006.01)
*C08G 18/48* (2006.01)
*C08G 18/08* (2006.01)
*C08G 18/10* (2006.01)

(52) U.S. Cl. .................. 528/59; 525/453; 525/457; 525/458; 525/460; 528/61; 528/65; 528/67; 528/76; 528/80; 528/906

(58) Field of Classification Search .............. 525/453, 525/460, 457, 458; 528/59, 61, 65, 67, 76, 528/80, 906
See application file for complete search history.

(56) References Cited

U.S. PATENT DOCUMENTS

| | | | | |
|---|---|---|---|---|
| 2,935,372 A * | 5/1960 | Steuber | ........................ | 264/83 |
| 3,424,828 A * | 1/1969 | Harris et al. | ............ | 264/211.16 |
| 3,453,357 A * | 7/1969 | Logan, Jr. | ..................... | 264/83 |
| 3,509,102 A * | 4/1970 | Horn et al. | .................... | 528/61 |
| 3,940,542 A * | 2/1976 | Knopf et al. | .................. | 528/61 |
| 4,871,818 A * | 10/1989 | Lodoen | ....................... | 525/440 |
| 4,973,647 A * | 11/1990 | Bretches et al. | .............. | 528/61 |
| 5,061,426 A * | 10/1991 | Frauendorf et al. | ......... | 264/205 |
| 5,340,902 A * | 8/1994 | Smith et al. | ................... | 528/61 |
| 5,616,675 A * | 4/1997 | Wilkinson | .................... | 528/61 |
| 5,691,441 A * | 11/1997 | Seneker et al. | ............... | 528/61 |
| 5,708,118 A * | 1/1998 | Seneker et al. | ............... | 528/61 |
| 5,723,563 A * | 3/1998 | Lawrey et al. | ................ | 528/61 |
| 5,840,233 A | 11/1998 | Foss | ....................... | 264/176.1 |
| 5,843,357 A * | 12/1998 | Seneker et al. | ............. | 264/204 |
| 6,100,360 A | 8/2000 | Twu et al. | .................... | 528/66 |
| 6,127,506 A * | 10/2000 | Greene | ........................ | 528/61 |
| 6,277,942 B1 * | 8/2001 | Foss | ............................. | 528/65 |
| 6,294,637 B1 | 9/2001 | Brauer et al. | ................. | 528/61 |
| 6,294,638 B1 | 9/2001 | Manning et al. | .............. | 528/76 |
| 6,323,299 B1 | 11/2001 | Handlin et al. | ............... | 528/65 |
| 6,399,003 B1 | 6/2002 | Umezawa | ................ | 264/176.1 |
| 6,417,312 B1 | 7/2002 | Kirchmeyer et al. | ......... | 528/59 |
| 2002/0052461 A1 | 5/2002 | Forschner et al. | ............ | 528/85 |
| 2002/0058777 A1 | 5/2002 | Brauer et al. | ................. | 528/44 |
| 2002/0107352 A1 | 8/2002 | Muller et al. | ................. | 528/51 |

\* cited by examiner

*Primary Examiner*—Rabon Sergent
(74) *Attorney, Agent, or Firm*—Leander F. Aulisio

(57) ABSTRACT

Melt spun thermoplastic polyurethane polymers useful as textile fibers and having good tenacity and recovery and substantially no gelation are disclosed. The polymers are prepared by a three-step polymerization process including: preparation of "hard" segment oligomer, preparation of "soft" segment oligomer and final reaction of "hard" segment with "soft" segment in a twin-screw reaction extruder to obtain a final polyurethane product having relatively uniform distances between the "hard" segments. The "soft" segment oligomer comprises blocks of polymeric glycol (poly) urethanes end capped with isocyanate groups. The "hard" segment oligomer comprises blocks of low molecular weight $C_2$–$C_6$ glycol (poly) urethanes.

14 Claims, No Drawings

MELT SPUN THERMOPLASTIC POLYURETHANES USEFUL AS TEXTILE FIBERS

FIELD OF THE INVENTION

The present invention relates generally to the preparation of melt spinnable thermoplastic polyurethane elastomers and, more specifically, to the preparation of polyurethane elastomers utilizing a novel multi-step polymerization process.

BACKGROUND OF THE INVENTION

Melt-spun elastomeric fibers have been in the past unacceptable for use as textile fibers because they have very low tenacity and poor recovery from elongation. Also, melt-spinnable thermoplastic urethane polymers have in the past formed gels too readily, thus inhibiting spinning of the material.

Prior art methods of forming melt-spun polyurethane fibers include the use of a "one shot process" wherein mixtures of diisocyanates, a polymeric glycol "soft" segment, and a low molecular weight glycol and a catalyst are all added to an extruder with mixing at a temperature of about 100° C. to about 250° C. and a time of about 1–5 minutes to obtain, after spinning, a polyurethane fiber. The properties of this fiber are limited because of the randomness of the polymerization process, the required rapid reaction and the substantially poor mixing. The urethane groups in the final product have no orderly arrangement, causing poor tenacity, unacceptable recovery from elongation and an unacceptable amount of gel formation.

The preparation of plastics in extruders is generally known. In contrast to the processing of plastics by a purely thermoplastic method, the term "reaction extrusion" is used in the case of such polymer synthesis in an extruder. Accordingly, the extruder used as the chemical reactor is frequently also referred to as a "reaction extruder".

Almost without exception, the literature recommends the twin-screw extruder in which both screws rotate in the same direction, for the synthesis of polyurethanes. Single-screw extruders and twin-screw extruders having counter-rotating screws are unsatisfactory owing to the poor mixing effect during passage through the extruder, and extruders having more than two screws are too expensive.

U.S. Pat. No. 5,621,024 (Eberhardt, et al) discloses a process for preparing thermoplastic polyurethane employing a twin-screw extruder having multiple zones. All reactants are fed as a low viscosity mixture to the extruder in a "one shot" process.

U.S. Pat. No. 5,136,010 (Reisch, et al) discloses a method of preparing a cast polyurethane or polyurea elastomer. The method comprises the steps of: fabricating a polyol having a specified molecular weight, reacting the polyol with a polyisocyanate to obtain an isocyanate-terminated prepolymer, and reacting the prepolymer with a non-(ethylene glycol) chain extender. The elastomer is prepared in a "one shot" process.

U.S. Pat. No. 5,116,931 (Reisch, et al) discloses a thermoset polyurethane or polyurea elastomer prepared in a "one shot" process.

U.S. Pat. No. 5,096,993 (Smith, et al) discloses a thermoplastic polyurethane or polyurea elastomer made by reacting in a "one shot" process a polyether diol, diisocyanate and a chain extender. The chain extender is a difunctional, isocyanate-reactive material.

U.S. Pat. No. 3,233,025 (Frye, et al) discloses a method of forming a thermoplastic polyurethane having free isocyanate groups. The method comprises the steps of mixing reactive components comprising an excess of an organic polyisocyanate and an organic compound containing at least two active hydrogen containing groups, reacting in a passageway at a temperature of about 60° C. to about 250° C. and a limited residence time, and removing the thermoplastic polyurethane. A twin-screw extruder can be employed.

SUMMARY OF THE INVENTION

In one aspect, the present invention relates to a melt spinnable themoplastic polyurethane elastomeric polymer made by a three-step process. Fibers prepared from the polyurethane elastomer have a tenacity of about 0.6 gm/denier and above, an elongation of about 400% and above, a percentage set from 200% stretch to about 10%, and gels of about 1 ppm and below in the melt. An advantage of the melt spinning is the ability to make a large range of sizes, all of which can be round, which is in contrast to the dry spinning processes.

The polyurethane fiber of the present disclosure exhibits unique structural properties on the molecular level. These properties allow the fiber to imitate the physical properties of well-known poly(ester)urea urethanes or poly(ether)urea urethanes such as Lycra®Spandex. The molecular structure of the fibers of the present disclosure reveals relatively similar lengths of "soft" segments spaced at substantially equal distance (by relatively similar lengths of "hard" segments) along the polymeric chain. The resulting configuration is an orderly arrangement of blocks of "hard" segments and blocks of "soft" segments. The orderly arrangement, unachievable in a conventional "one shot" process, gives the polyurethane fiber the qualities of high tenacity, high elongation and low set.

The molecular polarity of the polyurethane fiber of the present disclosure is weaker than the polarity of the Lycra®Spandex molecules because of a substantial lack of urea functionality in the polyurethane molecules. In order to compensate for this diversity in polarity, the present polyurethane fiber has a substantially higher molecular weight than Lycra®Spandex molecules.

A process for preparing a melt spinnable elastomeric polyurethane polymer is disclosed. The process comprises the steps of: preparing a first poly(ether)urethane oligomer (or poly(ester)urethane oligomer); preparing a second poly ($C_2$–$C_6$ glycol)urethane oligomer; and reacting in a reaction extruder, under relatively high mixing conditions, the first "soft" oligomer and the second "hard" oligomer. The final product is a poly(ether)urethane polymer or a poly(ester) urethane polymer containing an orderly arrangement of blocks of "hard" segments and blocks of "soft" segments. The term "polyurethane polymer" includes poly(ether)urethane polymer, poly(ester)urethane polymer, and poly(ether-ester)urethane polymer. These and other aspects of the invention will become apparent upon reading the following detailed description of the invention.

DETAILED DESCRIPTION OF THE INVENTION

The present disclosure relates to a melt spinnable composition useful in preparing textile fibers. The composition comprises a high molecular weight polyurethane polymer prepared from conventional starting materials. The polymer is prepared from at least two diol monomers wherein the two diol monomers are always reacted separately, and never in a "one shot" process.

The two diol monomers, which are always to be reacted separately, are: a first diol monomer of relatively high molecular weight and a second diol monomer of low molecular weight. The second diol monomer preferably has terminal hydroxyl groups, and has a molecular weight of about 62 to 122. In a preferred embodiment, the first diol monomer is a member selected from the group consisting of a polyether diol, a polyester diol and a mixed polyether-polyester diol.

The separate reactions of the two diol monomers are conducted in both cases with a diisocyanate monomer reactant. In a preferred embodiment, the diisocyanate monomer reactant is the same in both cases. Included within this preferred embodiment is the process wherein the same mixture of two or more diisocyanate monomers is employed.

The diisocyanate monomer preferably has terminal isocyanate groups, and the diisocyanate can be aliphatic or aromatic. Isomeric mixtures of diisocyanates can also be employed. Examples of diisocyanate monomers are 1,6-hexane diisocyanate, all isomers of toluene diisocyanate, and methylene diisocyanate.

The reaction between the second low molecular weight diol and the diisocyanate yields a product that is solid and potentially hard to melt. The length of the polymer chain which is prepared from the low molecular weight diol must be carefully controlled. Otherwise, the "hard segment", prepared from the low molecular weight diol and a diisocyanate, becomes intractable during the melt spinning process.

After the separate reactions of the two diol monomers are conducted, the two products are worked up and purified, if desired. When these two products are combined under reaction conditions in a reaction extruder along with suitable catalyst, a final polyurethane polymer product is obtained. The polyurethane polymer has a molecular weight of about 100,000 and above, and preferably about 200,000 and above. The tenacity of the polymer is about 0.6 grams/denier and above. The elongation of the polyurethane polymer is about 400% and above. All of the above properties are present in fibers prepared from said polyurethane polymer.

The high molecular weight polyurethane polymers contain "hard" segments and "soft" segments arranged in an orderly, non-random fashion. The "hard" segments are a product of the reaction between the second low molecular weight diol monomer and a diisocyanate. The "soft" segments are a product of the reaction between the first high molecular weight diol monomer and a diisocyanate monomer.

The melt spinnable composition containing the high molecular weight polyurethane polymer can be prepared by a process comprising the steps of: obtaining a polyol prepolymer which is a member selected from the group consisting of polyether diols, hydroxyl terminated polyester glycols, hydroxyl terminated polyether/polyester glycols, and mixtures thereof; adding to the polyol prepolymer a first organic diisocyanate to obtain a first mixture. The first mixture is then reacted under suitable reaction conditions to obtain a first polymer. This first polymer will become the "soft" segment in the final high molecular weight polyurethane polymer.

The process is then continued by obtaining a low molecular weight glycol; adding the glycol to a second organic diisocyanate to obtain a second mixture. The second mixture is then reacted under suitable reaction conditions to obtain a second polymer. The second polymer will become the "hard" segment in the final high molecular weight polyurethane polymer.

This second polymer typically has a molecular weight low enough to be metered to the reaction extruder. Viscosity must be controlled to allow the second polymer to be combined with the first polymer in the reaction extruder. This can be accomplished by reacting the low molecular weight diol with a suitable diisocyanate under conditions to maintain production of a second polymer of sufficiently low molecular weight.

To continue the process, the first polymer is combined with the second polymer in a reaction extruder under suitable reaction conditions. In a preferred embodiment, the mole ratio of isocyanate functionality to hydroxyl functionality in the combination of polymers is about 0.98:1 to about 1.2:1. A final product of high molecular weight polyurethane is withdrawn from the reaction extruder.

The process further comprises the steps of pelletizing the solid high molecular weight polyurethane, melting the pelletized material and then spinning the melted polyurethane into elastomer fibers.

In an alternative embodiment, the solid product withdrawn from the reaction extruder can be pelletized, melted, and then spun as a fiber into a vaporous aliphatic diamine. The fiber, as a result of this treatment, will have a minor amount of urea functionality.

In yet another alternative embodiment, the solid product withdrawn from the reaction extruder can be pelletized, melted, and then spun as a fiber into an aqueous solution of aliphatic diamine. Once again, the fiber will then have a minor amount of urea functionality.

In reference to the process step of adding a first organic diisocyanate to the polyol prepolymer, the mole ratio of isocyanate groups to hydroxyl groups in the mixture is preferably about 1:2 to about 1:1.1. The mixture is then preferably heated at a temperature of about 60° C. to about 100° C. and at atmospheric pressure for a time of about 20 minutes to about 100 minutes.

In reference to the process step of adding a second organic diisocyanate to the low molecular weight glycol, the mole ratio of isocyanate groups to hydroxyl groups in the mixture is preferably about 1:2 to about 1: 1.2. The mixture is then preferably heated at a temperature of about 50° C. to about 70° C. and at atmospheric pressure for a time of about 2 minutes to about 10 minutes.

In reference to the process step of combining the first "soft" polymer with the second "hard" polymer in a reaction extruder, the two polymers are contacted in the reaction extruder along with excess diisocyanate to obtain a ratio of free isocyanate groups to free hydroxyl groups of about 1:1 under high mixing conditions and a temperature of about 125° C. to about 260° C. for a time of about 2 minutes to about 8 minutes and at atmospheric pressure. The three-step process depends on the use of a controlled polymerization reaction to obtain a meltable form of the second polymer ("hard segment"), prepared from the low molecular weight diol and a second diisocyanate, for addition to the first polymer ("soft segment") in the reaction extruder. The final polyurethane polymer product can then be withdrawn from the reaction extruder, pelletized, melted, and spun into fibers.

The low molecular weight glycol preferably contains 2 to about 20 carbon atoms. Typical examples of such glycols include ethylene glycol, propylene glycol, 1,6-hexane diol, 1,4-butanediol, neopentyl glycol, diethylene glycol, thiodiglycol, 2,2-dimethyl-1,3-propylene glycol, and the like. In a most preferred example, the glycol is a $C_2$–$C_6$ glycol.

The polyol prepolymer can be a chain extended polyester made from a glycol, preferably a mixture of ethylene and butylene glycols, and a saturated organic dicarboxylic acid, preferably adipic acid. The acid usually contains 4 to 20 carbon atoms. Typical examples include succinic acid, maleic acid, dihydromalonic acid, thiodipropionic acid, adipic acid, methyl adipic acid, glutaric acid, dimerized linoleic acid, sebacic acid, suberic acid, phthalic acid, and terephthalic acid. To some extent hydroxycarboxylic acids or their lactones can be used, eg., caprolactone, to aid in forming the polyesters. As stated, mixtures of various dibasic acids and glycols can be used to form mixed esters.

An excess of the glycol over the acid is used in preparing the polyesters so that the resulting polyester contains terminal hydroxyl groups. In general, the most suitable polyesters are chiefly linear with melting point levels of 20° C. or lower and preferably not over 30° C. Less suitably natural polyesters can be used, eg., castor oil, as well as blown drying oils such as blown tung oil, linseed oil and soya oil.

As an alternative to the polyesters there may be used for reaction with the diisocyanate one or more elastomer yielding polyethers. Such polyethers are typically anhydrous chain extended polyethers possessing ether linkage separated by hydrocarbon chains either alkyl or aryl in nature. The ether should also contain terminal groups reactive with isocyanate, such as alcoholic hydroxyl groups. Such polyethers should be linear with a second order transition point of not over 25° C., preferably not over 10° C. Examples of polyethers are polyethylene glycol, polypropylene glycol, polybutylene glycol, mixed polyethylene glycolpolypropylene glycol, polytetramethylene glycol.

Polyethers not only can be used in place of the polyesters but can be used in conjunction therewith. Examples of such compounds are polydiethylene glycol adipate. Further examples of polyesters and polyethers which are suitable are set forth in Kohrn Patent 2,953,839 and the patents cited therein (column 2, lines 56–68).

Long lengths of "soft" segments are desired. In the fiber prepared from the final polyurethane elastomeric product, the "soft" segments regulate the elongation of the fiber and the recovery from stretch of the fiber. In order to obtain long lengths of "soft" segments, higher molecular weight diols can be employed. Another approach to achieving long lengths of "soft" segments is to regulate the capping ratio. This cannot be done in the "one shot" process.

The "soft" segments are oligomeric or polymeric and comprise blocks of polymeric glycol (poly)urethanes end capped with isocyanate groups. The "hard" segments are oligomeric or polymeric and comprise blocks of low molecular weight $C_2$–$C_6$ glycol (poly)urethanes having free hydroxyl end groups. Both the "soft" segments and the "hard" segments are structured so that they can chemically interact with one another under suitable polymerization conditions to obtain a final TPU (thermoplastic urethane) polymer.

Representative of the preferred aromatic diisocyanates which may be mentioned, by way of non-limiting examples are m- and p-phenylene diisocyanate, tolylene diisocyanate (65% 2, 4 and 35% 2, 6), p,p'-diphenylisocyanate, 1,5 naphthalene diisocyanate, p, p'-diphenyl-methane diisocyanate, 3,3'-bitolylene-4,4'-diisocyanate, 2,4-tolylene diisocyanate dimer, dianisidine diisocyanate, 4-chloro-1,3-phenylene diisocyanate. Aliphatic and cycloaliphatic diisocyanates can also be used, such as 1,4-tetramethylene diisocyanate, 4,4'-methylene-bis (cyclohexylisocyanate), and 1,5-tetrahydronaphthalene diisocyanate. Other diisocyanates can be employed including those set forth in the Kohrn Patent, as well as those mentioned in the patents set forth in Kohrn. The preferred diisocyanate is tolylene diisocyanate.

The vaporous aliphatic diamine generally has the formula $H_2N$—A—$NH_2$, where A is a divalent organic radical in which the terminal atoms are carbon, and which is devoid of groups reactive with isocyanate. As suitable amines there can be used ethylene diamine, hexamethylene diamine, 1,4-diaminocyclohexane, p-phenylenediamine, 3-3' diaminodipropyl ether, diaminodibutyl sulfide, propylene diamine. The preferred diamine is ethylene diamine.

Preferably, catalysts are employed in the final step of the three-step process to obtain a final polyurethane elastomeric product. Examples of catalysts are triethylamine, cobalt napthenate, stannous chloride, tetra-n-butyl tin, stannic chloride, tri-n-butyl tin acetate, n-butyl tin trichloride, trimethyl tin hydroxide, dimethyl tin dichloride, and di-n-butyl tin dilaurate. Because of the short residence time of the reactants in the reaction extruder during the final step of the three-step process, and also because of the relatively small volume inside the extruder, catalysts are usually necessary in order to speed the reaction and obtain high molecular weight thermoplastic polyurethanes. An extruder of relatively low volume is required to allow for good mixing conditions under standard power requirements.

Any conventional extruder can be employed in the process of preparing the final polyurethane elastomer product. The reaction extruder preferably employs a twin-screw, co-rotating, self-wiping, multi-heating zone design. In a preferred embodiment, the extruder has a length to diameter ratio of about 46:1 and greater. The free volume in the extruder should allow for a residence time of about 2 minutes to about 8 minutes. Extruders made by Bersdorff or Davis Standard are acceptable for use.

The ratio of the reactants, the temperature of the reaction, and the time of the reaction are all critical factors in determining the length of the first "soft" segment, which ultimately regulates the elongation and recovery properties of the fiber. The length of the first "soft" segment can be in multiples of the starting polyol.

In an alternative embodiment, a thermoplastic polyurethane elastomeric polymer having sufficient lengths of "soft" segments can be prepared from a two-step process. An adequate alignment of "soft" segments and "hard" segments is obtained in the final polymer. In a first step, a prepolymer is formed from a diisocyanate and polyether diol, a polyester diol, a mixed polyether-polyester diol or mixtures thereof. This prepolymer has "soft" segments of a diol end capped with diisocyanate groups. The first step is performed with good mixing and in a time of about 20 minutes.

In this alternative embodiment, only one prepolymer is prepared, and that prepolymer is the "soft" segment. The second step requires the addition of the prepolymer to a reaction extruder along with more diisocyanate and a low molecular weight glycol. Preferably, a catalyst is also added to the mixture in the reaction extruder. Catalysts can be selected from the group listed above in the disclosure of the three-step process. The reaction in the extruder includes both the "in situ" formation of "hard" segments and the formation of the final thermoplastic polyurethane elastomer having well-defined blocks of "soft" segments and random blocks of "hard" segments. The compounds added to the reaction extruder in the two-step process are adjusted in amount so that the mole ratio of isocyanate to hydroxyl approaches 1.000, with the proviso that gel formation should be avoided.

The temperature of the reaction extruder should be controlled within the range of about 200° C. to about 250° C.

In a modification of the two-step process, all of the diisocyanate necessary for formation of both the "soft" segment and "hard" segment can be added at once, during the first step. The product mixture obtained after the first step contains a first polymer ("soft segment") and unreacted diisocyanate. The product mixture from the first step is added to a reaction extruder in a second step along with a low molecular weight glycol. Optionally, a catalyst can also be added to the extruder. Under appropriate reaction conditions, the second polymer ("hard segment") is formed "in situ" and then a final thermoplastic polyurethane (TPU) elastomer is formed.

Fibers prepared from the TPU (thermoplastic urethane) elastomeric compositions of the two-step process do not have physical properties identical to the fibers prepared from polymeric compositions prepared according to the three-step process. However, the physical properties of both the "two-step process" fibers and the "three-step process" fibers are adequate for the manufacture of textile materials and the like. The two-step process requires less equipment and less control than the three-step process.

In both the two-step process and the three-step process, the physical properties of the fibers are dependent on the following parameters: (1) the ratio of "hard" segments in the polymer backbone; (2) the uniformity of the distribution of blocks of "hard" segments and blocks of "soft" segments in the polymeric backbone; (3) the length of the "soft" segment in the polymeric backbone; and (4) the post-treatment regimen (e.g., stretching, heat setting, and the like conducted on the fiber).

All the parameters disclosed above are to be considered when a manufacturer produces a TPU elastomeric polymer composition suitable for melt spinning into fibers useful in the textile industry. Any of the parameters can be varied within certain ranges in the interest of economics and still obtain useful fibers.

The multi-step processes disclosed above have many advantages over the prior art processes as presented in the literature. Both multi-step processes disclosed above yield a melt spinnable polymeric material. There is no need or limited need for the use of solvents, and therefore the processes are environmentally friendly. The polymers prepared according to the multi-step processes herein disclosed have a combination of high tenacity, high recovery from stretch, high elongation and freedom from any gels greater than 20 micrometers.

All prior art one-shot processes cannot produce the necessary alignment of "soft" segments and "hard" segments. A one-shot process is when all reagents (polyol, glycol, diisocyanate and catalyst) are metered simultaneously into a reaction extruder. The products are polyurethanes from polymeric glycols and low molecular weight glycols, said products having random distributions of urethane linkages in the polymeric backbone. There is no adequate alignment of "soft" segments and "hard" segments, as all reactions in the extruder are completed in a random fashion and usually in less than three minutes. When such a situation exists, small amounts of materials reach a molar ratio of isocyanate to hydroxyl of exactly 1.000. When such a ratio is reached, a polymer of "infinite" molecular weight is formed (gels). It is practically impossible to prevent such a situation when a one-shot process is employed.

One-shot processes are usually conducted at a temperature of about 125° C. to about 260° C. and at a time of about 3 minutes. Only one reaction extruder is employed, and no prepolymers are formed (except for the uncapped polylol). The final TPU elastomeric product contains only random alignments of "hard" segments and "soft" segments. The one-shot processes lack the ability to precisely control the desired high molecular weights.

In the multi-step processes herein disclosed, choice of catalyst greatly affects the reaction rate of the isocyanate and hydroxyl group. For example, if an uncatalyzed reaction of isocyanate with hydroxyl group is designated as having a reaction rate of 1, then the reaction rates of isocyanate with hydroxyl group for various catalysts are as follows: triethylamine (11), cobalt naphthenate (23), stannous chloride (68), tetra-n-butyl tin (82), stannic chloride (99), tri-n-butyl tin acetate (500), n-butyltin trichloride (83), trimethyl tin hydroxide (1800), dimethyltin dichloride (2100), and di-n-butyl tin dilaurate (37000). Also, undesirable side reactions of the isocyanate with water are suppressed by the use of a catalyst. With the use of dibutyltin diacetate, the rate of reaction of isocyanate with hydroxyl group as compared to the reaction of isocyanate with water is about 6:1.

While the invention has been described by specific embodiments, there is no intent to limit the inventive concept except as set forth in the following claims.

I claim:

1. A composition useful in preparing melt spun textile fibers comprising a polyurethane polymer consisting of the reaction product of monomers consisting of at least one diisocyanate monomer and at least two diol monomers, a first diol monomer which is a member selected from the group consisting of a polyether diol, a polyester diol, hydroxyl terminated polyether/polyester glycols and mixtures thereof; and a second diol monomer having a molecular weight of about 62 to about 118, said polyurethane having a molecular weight of about 200,000 and above, a tenacity of about 0.6 gm/denier and above, and an elongation of about 400% and above, wherein said first and second diol monomers are always reacted separately during preparation of the polyurethane polymer.

2. A composition according to claim 1 wherein the at least one diisocyanate monomer is a member selected from the group consisting of aliphatic monomers having terminal isocyanate groups, aromatic monomers having terminal isocyanate groups, mixtures of said aliphatic and aromatic monomers, mixtures of isomers of an aliphatic monomer having terminal isocyanate groups and mixtures of isomers of an aromatic monomer having terminal isocyanate groups.

3. A composition according to claim 2 wherein the at least one diisocyanate monomer is a member selected from the group consisting of 1,6-hexane diisocyanate, toluene diisocyanate isomers and methylene bis (phenylisocyanate) isomers.

4. A composition according to claim 1 wherein the polyurethane polymer contains "hard" segments and "soft" segments, said segments arranged in an orderly fashion.

5. A process of preparing a polyurethane polymer fiber precursor, the precursor consisting of a polymer having a molecular weight of about 200,000 and above, a tenacity of about 0.6 grams/denier and above, and an elongation of about 400% and above, the process comprising the steps of:

a) obtaining a polyol prepolymer which is a member selected from the group consisting of hydroxyl terminated polyester glycols, hydroxyl terminated polyether glycols, hydroxyl terminated polyether/polyester glycols, and mixtures thereof;

b) adding a first organic diisocyanate to the polyol prepolymer wherein the mole ratio of isocyanate group to hydroxy group is about 1.2 to 1:1.1 to obtain a first mixture;

c) reacting the first mixture of first organic diisocyanate and polyol prepolymer at a temperature of about 60° C. to about 100° C. and at atmospheric pressure for a time of about 20 minutes to about 100 minutes to obtain a "soft" polymer;

d) obtaining a $C_2$–$C_6$ glycol having terminal hydroxyl groups;

e) adding a second organic diisocyanate to the glycol wherein the mole ratio of isocyanate to hydroxyl is about 1:2 to about 1:1.2 to obtain a second mixture;

f) reacting the second mixture of second organic diisocyanate and $C_2$–$C_6$ glycol at a temperature of about 50° C. to about 70° C. and at atmospheric pressure for a time of about 2 minutes to about 10 minutes to obtain a "hard" polymer;

g) combining the "soft" polymer from (c) with the "hard" polymer from (f) in an extruder to obtain a combination of polymers wherein the mole ratio of isocyanate functionality to hydroxyl functionality in the combination is about 0.98:1 to about 1.2:1;

h) reacting the combination of polymers in the extruder at a temperature of about 125° C. to about 260° C. for a time of about 2 minutes to about 8 minutes and at atmospheric pressure to obtain a final polyurethane polymer; and j) extruding the final polyurethane polymer to obtain a solid product of polyurethane polymer fiber precursor.

6. A process according to claim 5 further comprising the steps of:

k) pelletizing the solid product of polyurethane polymer fiber precursor;

l) melting the pelletized solid product; and m) spinning the melted product to obtain a polyurethane polymer fiber.

7. A process according to claim 5 wherein the polyol prepolymer of step (a) is a liquid under standard conditions of temperature and pressure.

8. A process according to claim 5 wherein the first organic diisocyanate of step (b) and the second diisocyanate of step (e) are each a member selected from the group consisting of 1,6-hexane diisocyanate, toluene diisocyanate isomers, and methylene bis (phenylisocyanate) isomers.

9. A process according to claim 5 wherein step (h) is conducted in the presence of a catalyst.

10. A process for preparing a polyurethane polymer fiber precursor, the precursor consisting of a polymer having a molecular weight of about 200,000 and above, a tenacity of about 0.6 grams/denier and above, and an elongation of about 400% and above, the process comprising the steps of:

(a) obtaining a polyol prepolymer which is a member selected from the group consisting of hydroxyl terminated polyester glycols, hydroxyl terminated polyether glycols, hydroxyl terminated polyether/polyester glycols, and mixtures thereof;

(b) adding a first organic diisocyanate to the polyol prepolymer wherein the mole ratio of isocyanate to hydroxyl is about 1.2 to about 1:1.1 to obtain a first mixture;

(c) reacting the first mixture of first organic diisocyanate and polyol prepolymer at a temperature of about 60° C. to about 100° C. and at atmospheric pressure for a time of about 20 minutes to about 100 minutes to obtain a "soft" polymer;

(d) obtaining a $C_2$–$C_6$ glycol having terminal hydroxyl groups;

(e) obtaining a second organic diisocyanate;

(f) combining the "soft" polymer with the $C_2$–$C_6$ glycol of step (d) and the second organic diisocyanate of step (e) in a reaction extruder to obtain a combination of "soft" polymer, $C_2$–$C_6$ glycol and diisocyanate, wherein the mole ratio of isocyanate group to hydroxyl group is adjusted to approach 1:1, with the proviso that gel formation is avoided;

(g) reacting the combination of "soft" polymer, $C_2$–$C_6$ glycol and diisocyanate in the reaction extruder at a temperature of about 125° C. to about 260° C. for a time of about 2 minutes to about 8 minutes and at atmospheric pressure to obtain a final polyurethane polymer; and (h) extruding the final polyurethane polymer to obtain a solid product of polyurethane polymer fiber precursor.

11. A process according to claim 10 further comprising the steps of:

(j) pelletizing the solid product of polyurethane polymer fiber precursor;

(k) melting the pelletized solid product; and (l) spinning the melted product to obtain a polyurethane polymer fiber.

12. A process according to claim 10 wherein the polyol prepolymer of step (b) is a liquid under standard conditions of temperature and pressure.

13. A process according to claim 10 wherein the organic diisocyanate of step (b) is a member selected from the group consisting of 1,6-hexane diisocyanate, toluene diisocyanate isomers, and methylene bis (phenylisocyanate) isomers.

14. A process according to claim 10 wherein step (g) is conducted in the presence of a catalyst.

* * * * *